United States Patent
Sunkavally et al.

(10) Patent No.: US 11,055,398 B2
(45) Date of Patent: Jul. 6, 2021

(54) MONITORING STRENGTH OF PASSWORDS

(71) Applicant: RSA Security LLC, Bedford, MA (US)

(72) Inventors: Naveen Sunkavally, Cary, NC (US); Salah E. Machani, Medford, MA (US)

(73) Assignee: RSA Security LLC, Bedford, MA (US)

( * ) Notice: Subject to any disclaimer, the term of this patent is extended or adjusted under 35 U.S.C. 154(b) by 162 days.

(21) Appl. No.: 16/178,636

(22) Filed: Nov. 2, 2018

(65) Prior Publication Data

US 2020/0143036 A1     May 7, 2020

(51) Int. Cl.
  *G06F 21/46*   (2013.01)
  *H04L 29/06*   (2006.01)
  *G06F 21/31*   (2013.01)

(52) U.S. Cl.
  CPC .............. *G06F 21/46* (2013.01); *G06F 21/31* (2013.01); *H04L 63/0428* (2013.01); *H04L 63/102* (2013.01)

(58) Field of Classification Search
  CPC ..... G06F 21/31; G06F 21/46; H04L 63/0428; H04L 63/102
  See application file for complete search history.

(56) References Cited

U.S. PATENT DOCUMENTS

| | | | |
|---|---|---|---|
| 5,699,514 A * | 12/1997 | Durinovic-Johri | ..... G06F 21/31 726/19 |
| 6,668,322 B1 | 12/2003 | Wood | |
| 8,769,607 B1 * | 7/2014 | Jerdonek | ................. G06F 21/46 726/1 |
| 9,009,815 B2 | 3/2015 | Pieczul | |
| 9,178,876 B1 * | 11/2015 | Johansson | ............. H04L 9/0897 |
| 9,384,343 B2 | 6/2016 | Alessio | |
| 2004/0073815 A1 * | 4/2004 | Sanai | ....................... G06F 21/46 726/6 |
| 2005/0108579 A1 * | 5/2005 | Isaacson | .................. G06F 21/31 726/19 |
| 2005/0235341 A1 | 10/2005 | Stieglitz | |
| 2009/0150677 A1 * | 6/2009 | Vedula | ..................... G06F 21/46 713/183 |
| 2009/0241173 A1 * | 9/2009 | Troyansky | .......... H04L 63/1441 726/5 |
| 2009/0313696 A1 * | 12/2009 | Himberger | .............. G06F 21/46 726/22 |
| 2009/0328169 A1 * | 12/2009 | Hutchison | ............... G06F 21/41 726/7 |

(Continued)

OTHER PUBLICATIONS

Taha et al., On Password Strength Measurements: Password Entropy and Password Quality, Aug. 2013, International Conference on Computing, Electrical and Electronic Engineering, pp. 497-501 (Year: 2013).*

(Continued)

*Primary Examiner* — Kenneth W Chang
(74) *Attorney, Agent, or Firm* — Danielson Legal LLC (57) ABSTRACT

A method is used in monitoring strength of passwords. A a request is received from a user to use a user password. A password score is determined for the user password. The password score indicates quality of the user password. Based on the password score, the strength of the user password is evaluated in a privacy preserving manner. The privacy preserving manner indicates avoiding storing information regarding the user password after strength of the user password has been evaluated.

17 Claims, 3 Drawing Sheets

(56) References Cited

U.S. PATENT DOCUMENTS

| | | | | |
|---|---|---|---|---|
| 2012/0284783 | A1* | 11/2012 | Jakobsson | G01B 9/02083 726/6 |
| 2013/0269010 | A1* | 10/2013 | Wheeler | G06F 21/46 726/6 |
| 2013/0283337 | A1* | 10/2013 | Schechter | G06F 21/46 726/1 |
| 2014/0068731 | A1* | 3/2014 | Belisario | G06F 21/46 726/6 |
| 2014/0373088 | A1* | 12/2014 | Aggarwal | G06F 21/604 726/1 |
| 2015/0067760 | A1* | 3/2015 | Waltermann | G06F 21/46 726/1 |
| 2015/0220715 | A1* | 8/2015 | Kim | G06F 21/46 726/18 |
| 2015/0304302 | A1* | 10/2015 | Zhang | H04L 63/1408 713/171 |

OTHER PUBLICATIONS

Office Action for U.S. Appl. No. 16/178,646, dated Nov. 27, 2020, 9 pages.

\* cited by examiner

MONITORING STRENGTH OF PASSWORDS

CROSS-REFERENCE TO RELATED APPLICATIONS

This application is related to co-pending U.S. patent application Ser. No. 16/178,646 for MANAGING ENTERPRISE AUTHENTICATION POLICIES USING PASSWORD STRENGTH and filed concurrently herewith, which is incorporated herein by reference for all purposes.

FIELD OF THE INVENTION

This application relates to monitoring strength of passwords.

BACKGROUND

Computer networks are often configured to incorporate network security systems in order to protect the networks against malicious activity. Such malicious activity can include, for example, fraudulent access requests made by human users or possibly by networks of compromised computers or "botnets."

Network security systems can be designed to protect a computer network of a company, organization or other large enterprise comprising many thousands of user devices. However, enterprise computer networks are in many cases continuously growing in size, and often incorporate a diverse array of user devices, including mobile telephones, laptop computers and tablet computers. This continuous growth can make it increasingly difficult to provide a desired level of protection using the limited resources of the network security system. For example, available network security system functionality such as processing of security alerts and deployment of attack remediation measures on user devices can be strained by the demands of large enterprise networks.

Moreover, recent years have seen the rise of increasingly sophisticated attacks including advanced persistent threats (APTs) which can pose severe risks to enterprises. These APTs are typically orchestrated by well-funded attackers using advanced tools to adapt to the victim environment while maintaining low profiles of activity. As a result, conventional credential-based authentication techniques and other traditional defenses typically deployed by enterprise network security systems today often fail at detecting and remediating access anomalies at a sufficiently early stage.

One type of credential-based authentication technique is a user password. User passwords, however, are notorious for a being a weak link in information security. Yet they remain ubiquitous and are not going away anytime soon.

There is a need for periodic password quality monitoring within networks, whether they are enterprise networks, public networks, and the like, that simultaneously preserve privacy of the user's password.

SUMMARY

A method is used in monitoring strength of passwords. A a request is received from a user to use a user password. A password score is determined for the user password. The password score indicates quality of the user password. Based on the password score, the strength of the user password is evaluated in a privacy preserving manner. The privacy preserving manner indicates avoiding storing information regarding the user password after strength of the user password has been evaluated.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Illustrative embodiments may be described herein with reference to exemplary cloud infrastructure, data centers, data processing systems, computing systems, data storage systems and associated servers, computers, storage units and devices and other processing devices. It is to be appreciated, however, that embodiments of the invention are not restricted to use with the particular illustrative system and device configurations shown. For example, the term "computer network" as used herein is intended to be broadly construed, so as to encompass, for example, any system comprising multiple networked computing devices.

Described below is a technique for use in monitoring strength of passwords, which technique may be used to provide, among other things, receiving a request from a user to use a user password, determining a password score for the user password, wherein the password score indicates quality of the user password, and based on the password score, evaluating strength of the user password in a privacy preserving manner, wherein the privacy preserving manner indicates avoiding storing information regarding the user password after strength of the user password has been evaluated.

The term "module" is intended to be interpreted broadly as software, firmware, or both configured to operate on a processor or in memory for performing a function as described more fully with respect to embodiments.

Embodiments herein are intended to be deployed on or in private or public cloud computing, private or public networks, private or public data storage systems, or any other electronic device protected by password authentication.

Similarly, the term "enterprise" is to be construed broadly to include, without limitation, an organization, a network, a group, an affiliation, a team, a league, humans organized by one or common attributes, machines organized by one or more common attributes, and the like. The term "password" is to be construed broadly so as to encompass, without limitation, any combination of information, whether text, photographic, audio, optical, biometric, and the like, used to grant or deny access to something tangible, such as without limitation, a network, data, a public or private cloud, a physical location, a virtual location, a web browser, an API, a portal, an enterprise cloud, and the like.

A given embodiment may more generally comprise any arrangement of one or more devices.

One important aspect of passwords is password quality, also known as password strength. In a conventional system, password quality is generally only considered when a user creates or resets his or her password. But, password quality may change over time, for instance, as new breaches with user passwords are disclosed or as certain terms become more popular in the media. Thus, in such a conventional system, once a user has established his or her password, the strength of the password is not evaluated again until the user resets the password.

Password strength checking is a de facto standard in end-user applications that require users to have passwords. Password strength checking is typically done upfront when a user is setting or resetting his or her password, and it's used to guide users in choosing passwords that are unlikely to be cracked by attackers. Strength checking can be done client-side (for instance in the client's web browser or a mobile app) or server-side, with the password or a partial hash of the password being sent over a secured connection to another host.

One form of password strength checking relies on password policies that prescribe a minimum password length and the types of characters (such as uppercase and lowercase letters, numbers, and special characters) that must be contained in the password. Techniques that use statistics and machine learning have become available and there are third-party remote web services that can be used for password strength checking, where such services match passwords against known bad passwords and known breached passwords.

While conventional password checking applications check password quality offline and notify users if their passwords are known to have been breached, such conventional solutions are not privacy preserving. Such conventional systems require knowledge of the user's password ahead of time, either in plain text format, or as a hash. In such a conventional system, a password that has only been hashed is not truly secure because it's not also been salted, a technique that is considered a security best practice. Salting is not feasible in this conventional system as it would prevent checking of the user's password against a known bad/breached password list. Thus, in such a conventional system, such passwords are subject to a brute force attack if they are ever exposed.

By contrast, in at least some implementations in accordance with the technique as described herein, monitoring strength of a password continuously in a privacy preserving manner mitigates the risk of compromise due to inadvertent or malicious exposure of the password. In at least some implementations in accordance with the current technique as described herein, the use of the monitoring strength of passwords technique can provide one or more of the following advantages: mitigation of the security threat posed during password authentication by evaluating password quality or strength more frequently instead of only evaluating the password at the time the password is initially established, and avoiding using additional storage for storing information such as metadata for passwords during monitoring of strength of password in a privacy preserving manner.

Thus, unlike other conventional techniques that check password quality, the current technique described here does not require additional storage of passwords or password-related metadata in any form, either in plain text or hashed.

The techniques presented herein describe a privacy-preserving mechanism for assessing password strength periodically, as opposed to just at the point in time when a user establishes a password. In some embodiments, password strength can be checked each time a user logs into a network or otherwise seeks access to information or data. One of the aspects of this invention, namely the privacy-preserving feature, enhances network security by mitigating the chances of misappropriation or interception of a stored password or a stored hash of a password. In some embodiments, enterprise policies or administrative policies can be used to set password strength values required for access to data. These strength values fluctuate based on myriad considerations such as sensitivity of the data, characteristics of the user seeking access, geolocation of the data or the user, and so forth.

This application teaches a method, system and product for measuring password quality in a privacy-preserving manner. Password quality serves a gatekeeping function for accessing networks or databases. In some embodiments, password quality gatekeeping functions are provided without the need to store user's passwords or hashes of user's passwords, thus mitigating the risk of compromise due to inadvertent or malicious exposure. In some embodiments, the teachings herein can be applied in an enterprise context. In these embodiments, enterprise-level authentication policies can serve gatekeeping functions based on password quality or strength.

Figure 1:
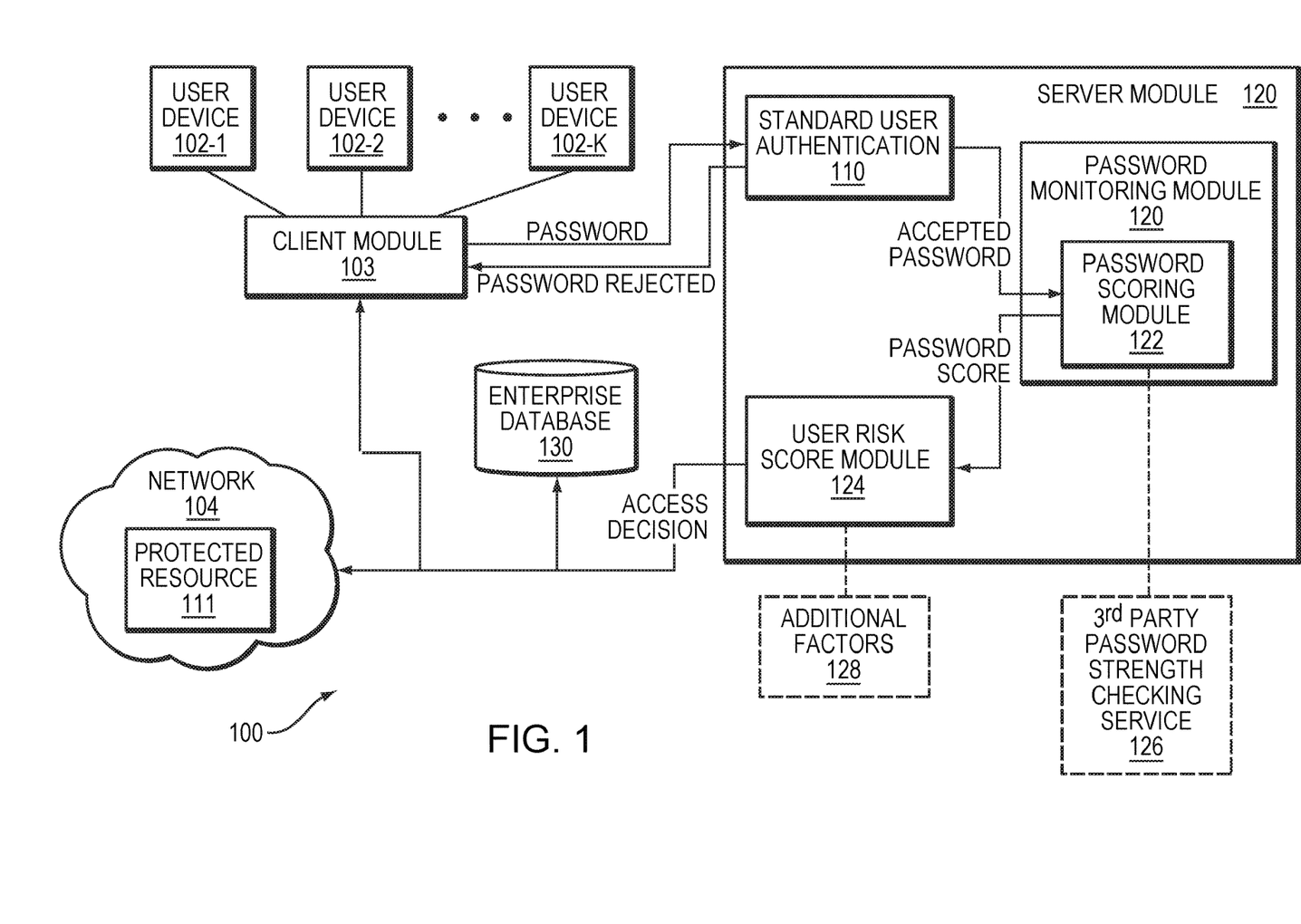
FIG. 1 is a block diagram of a computer network configured with functionality for monitoring the strength of a password while preserving password privacy in an illustrative embodiment.

In order to explain the functionality of embodiments, a portion of a computer network 100 configured in accordance with an illustrative embodiment is shown in FIG. 1. The components in FIG. 1 will be discussed more fully and contextually with regard to FIG. 2. Referring back to FIG. 1, partial computer network 100 comprises a plurality of user devices 102-1, 102-2, . . . 102-K, collectively referred to herein as user devices 102. The user devices 102 are coupled to a client module 103. The client module 103 can be an external processor, as shown in FIG. 1. In alternate embodiments the client module could be incorporated into one or more user device 102, into server module 120, into network 104, or into enterprise database 130.

The user devices 102 comprise, for example, mobile telephones, laptop computers, tablet computers, desktop computers or other types of devices, in any combination, that are capable of supporting user logins or other types of requests to access protected resources of the computer network 100. These user devices 102 are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using Internet protocol (IP) or other related communication protocols.

Network 104 further comprises protected resources 111, which could be internally stored, externally stored, coupled to, and so forth, network 104. In embodiments, protected resources 111 are resources requiring password authentication of a sufficiently robust password prior to being granted access thereto. Similarly, the information housed within database 130 also requires password authentication according to embodiments described more fully below.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art. Optionally, the password monitoring system 105 has an associated database 106 configured to store user enterprise data 107 accessible by some or all of the users in various embodiments. The database 106 in the present embodiment is implemented using one or more storage systems associated with the password monitoring system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

The storage system utilized to implement database 130 and possibly other parts of the computer network 100 can comprise at least one VNX® or Symmetrix VMAX® storage array from Dell EMC of Hopkinton, Mass. Other types of storage arrays that may be used in illustrative embodiments include scale-out all-flash content addressable storage arrays such as XtremIO™ storage arrays, all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In addition to client module 103, embodiments herein are further executed on server module 120. Server module 120 oversees password quality assessment as well as determining whether the user's password is sufficiently strong enough to allow access to the desired material, either protected resource 111, database 130, or both. FIG. 1 depicts a standard user authentication module 110 as a precursor to the systems, methods, and products of the inventive embodiments. The password authentication performed by the standard authentication model is known in the art and may be performed either before or after password strength assessments are performed.

For simplicity, we assume that password authentication has transpired prior to password strength assessment. In this scenario, a user enters his or her password using user device 102. User device 102 transmits, or shares, the password to client module 103, which in turn relays the password to standard user authorization module 110. If the password is incorrect, it is rejected. The user is notified of the rejection and likely given an opportunity to reenter the password.

If the password is verified, standard user authorization module 110 relays the password to password monitoring module 120. Once the password is received by password monitoring module 120, password scoring module 122 computes a password score for the password. The password score is a measure of the quality of the password. In an alternate embodiment, password monitoring module 120 could also include a module that measures password strength by using a $3^{rd}$ party password strength checking service 126 in addition to, or in lieu of, the password scoring module 122.

Once a password score has been calculated, it is transmitted to, which can likewise mean shared with, user risk score module 124. User risk score module 124 contains logic sufficient to determine whether the user's password is secure enough to comply with network policies, administrator policies, enterprise policies, or additional factors such as frequency of use of the particular password, geolocation of the user, sensitivity of the data, and myriad other criteria that is controlled by an administrative or policy enforcing entity.

If the password is strong enough, user risk score module 124 relays an access grant message to one or more of client module 103, network 104, database 130, or a user. Similarly, if the password is not sufficiently strong, user risk score module 124 relays an access denied message to one or more of client module 103, network 104, database 130, or a user. Importantly, the strength/quality calculations and decisions related to granting or denying access are performed without the need to store the user's password in memory.

In some embodiments, a strength/quality assessment of a user's password is performed every time the password is used when he or she logs on or seeks access to protected resource 111, database 130, or any other sensitive information.

In additional embodiments, the password strength measurements is performed when a user establishes a new password or resets a password.

In embodiments, client module 103 is a component, which runs locally on the user's device 102, and which carries out the authentication process on behalf of the user. In this embodiment, client module 103 could be an application running in a web browser on a user's laptop, a mobile app on the user's phone, or an operating system. In this embodiment, standard user authentication module 110 resides within the user's device 102.

In embodiments, the server module 120 handles server-side authentication functions, often residing on one or more remote hosts over the network. Note that the word "module" is a logical term and does not imply a single operating system process. One or more of the components of the server module 120 (standard user authentication 110, password scoring 122, and user risk score 124 evaluation need not all run on the same physical host or service provider.).

In some embodiments, the user's password score may be too low, necessitating either a password reset, or additional security measures such as two-factor authentication, a step-up authentication, biometric authentication, and the like to ensure sufficient password strength.

Figure 2:
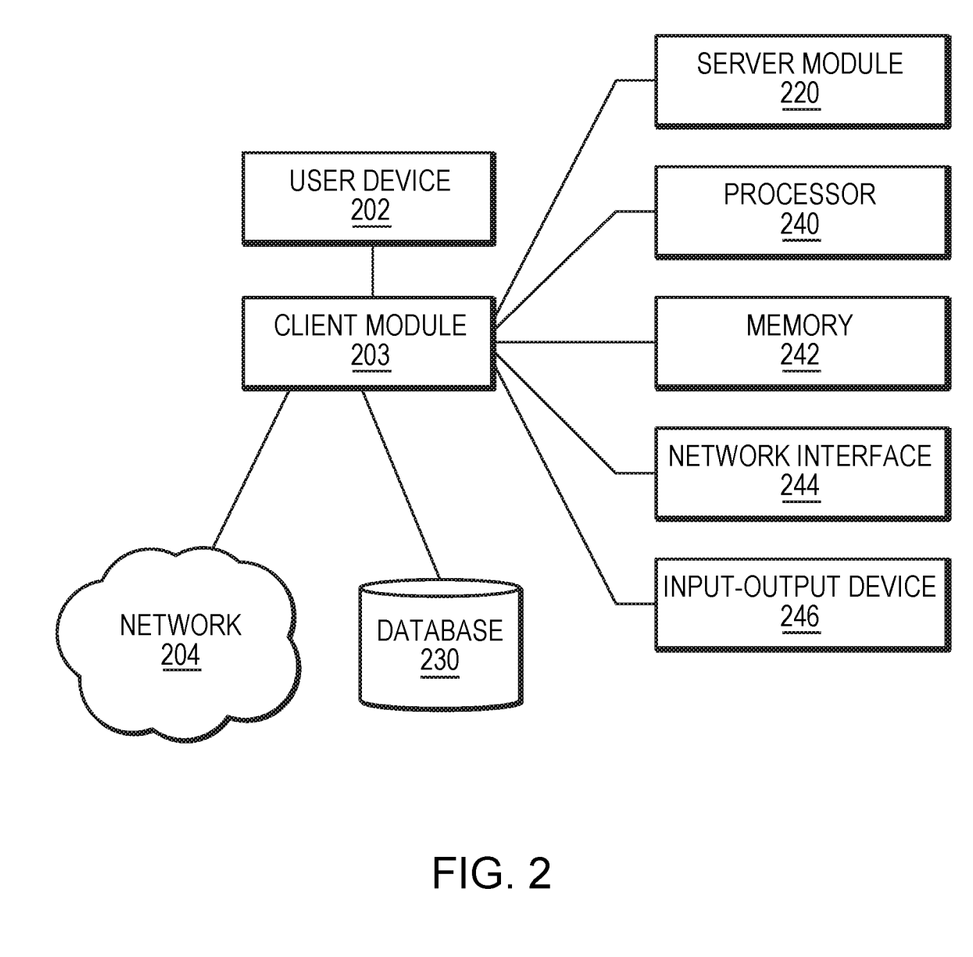
FIG. 2 is a block diagram of a computer network configured with functionality for monitoring the strength of a password while preserving password privacy in an illustrative embodiment.

FIG. 2 depicts the partial network 100 in fuller context. While not all elements of FIG. 1 have been reproduced in FIG. 2, it is understood that one or more of the various modules 110, 122, 124, 128, 126, which are part of the server module 220 and protected resources 111, which is part of network 204 are included in the larger scale network depicted in FIG. 2. FIG. 2 depicts a user device 202, coupled to a client module 203, which in turn is coupled to a network 204 and/or a database 230. The client module 203 is also coupled to one or more of server module 220, processor 240, memory 242, network interface 244, and input-output device 246.

Although a single processor 240 is depicted, it is understood that there could be any number of processors present. The processor 240 illustratively comprises a microprocessor, a microcontroller, an application—specific integrated circuit (ASIC), a field-programmable gate array (FPGA), a graphics processing unit (GPU) or other type of processing circuitry, as well as portions or combinations of such circuitry elements.

The memory 242 illustratively comprises random access memory (RAM), read-only memory (ROM), flash memory or other types of memory, in any combination. The memory 242 and other memories disclosed herein may be viewed as examples of what are more generally referred to as "processor-readable storage media" storing executable computer program code or other types of software programs.

Articles of manufacture comprising such processor-readable storage media are considered illustrative embodiments of the present disclosure. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 244 allows the server module 220 to communicate via client module 203 to network 204, user devices 202, database 230, and protected resource 111. Network interface 244 illustratively comprises one or more conventional transceivers. In alternate embodiments, network interface 244 is directly coupled to one or more of network 204, user devices 202, database 230, or protected resource 111.

Input-output device 246 can be a keyboard, display, voice recognition device, or other type of input-output device in any combination. These input-output devices 246 can be used to support one or more user interfaces to any of the devices depicted in the network 200.

Figure 3:
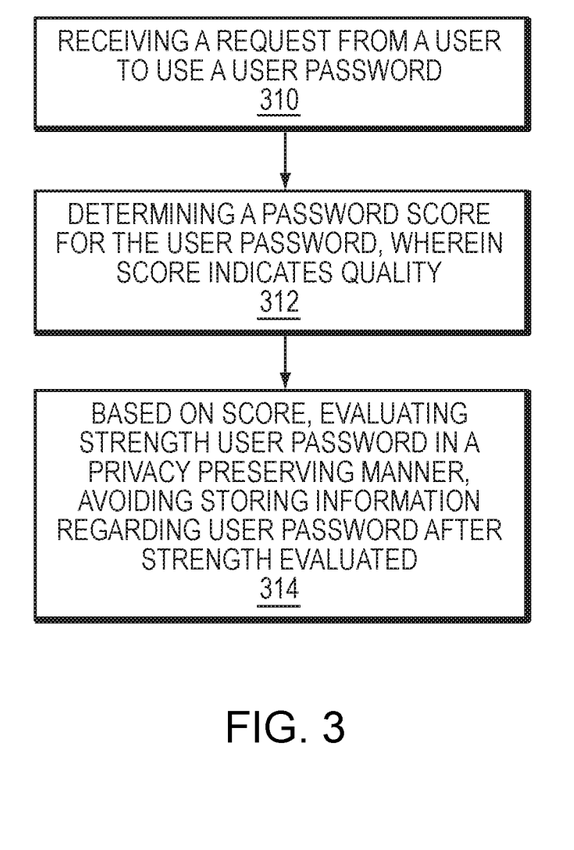
FIG. 3 is a flow diagram of a process for monitoring the strength of a password while preserving password privacy in an illustrative embodiment.

FIG. 3 depicts exemplary method steps for embodiments. Specifically, in method embodiments, we disclose a method of monitoring password strength. In these embodiments, we receive 310 a request from a user to use a user password. In some embodiments, the request is a prerequisite to being granted access to protected data. In at least some embodiments, the password request is sent when a user is establishing a password. In other methods, the password request is sent in the normal course once a user has already established a password. In some embodiments, the method steps are followed every time a user logs in using a password. However, the method steps in alternate embodiments need only be followed periodically or even sporadically if desired.

Next, the method determines 312 a password score for the user's password. In this step, the password score is indicative of the quality of the password. Based on the password score, password strength is evaluated 314. The evaluation 314 is performed without storing the password, or any information regarding the password itself such as for example a hash of the password, after the password score is determined 312.

In some embodiments, evaluating 314 the password score includes determining whether the user will be granted access to data 111, or network 104, 204, database 130, 230, or to any asset with an enterprise. In these embodiments, myriad factors regarding the protected resource 111, network 104, 204, database 130, 230, or any additional enterprise asset will be considered, including sensitivity of the data, strength of the password, frequency of use of the password, whether the password is known on a publicly available site to be compromised, characteristics of the user, e.g., the user's position within an enterprise, or a preauthorized registration indicating trustworthiness, the location of the user, the location of the protected information, the accessibility of the protected information to others, and the like.

In some embodiments, evaluation 314 of these factors leads to a requirement to enhance user login credentials. In these embodiments, a user is asked to perform a step-up authentication, a two-factor authentication, or a biometric authentication.

The embodiments above do not presuppose where the server process or machine learning components reside. They could be hosted on premise within the purview of an enterprise or hosted as a service by a trusted third party.

Throughout the entirety of the present specification, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of controlling access to resources by monitoring a strength of a password, the method comprising:
   receiving a first request from a user to access a first resource;
   receiving, after receiving the first request, a user password from the user as a condition of determining whether access to the first resource should be granted;
   successfully authenticating the received user password, wherein the user password has been authenticated at least one additional time in the past;

determining a password score for the user password after successfully authenticating the user password, wherein the password score indicates quality of the user password;

based on the determined password score, evaluating strength of the user password in a privacy preserving manner, wherein the privacy preserving manner indicates avoiding storing information in a memory or a processor regarding the user password after the strength of the user password has been evaluated;

denying access to the first resource because the strength of the user password does not exceed a first threshold score;

receiving a second request from the user to access a second resource;

receiving the user password from the user as a condition of determining whether access to the second resource should be granted;

successfully authenticating the user password in connection with the second request;

determining a second password score for the user password after successfully authenticating the user password, wherein the second password score indicates quality of the user password;

based on the second password score, evaluating strength of the user password; and granting access to the second resource because the second password score exceeds a second threshold score.

2. The method of claim 1, wherein the second password score is different than the first password score.

3. The method of claim 1, wherein a client module resides within a web application, on a mobile device, or a computing device.

4. The method of claim 1, wherein determining the password score and evaluation of strength of the user password is performed by a password scorer module.

5. The method of claim 1, wherein a client module and a password scorer module reside within a single device.

6. The method of claim 5, wherein the user password is sent to a password scorer module over a secure connection.

7. The method of claim 1, wherein strength of the user password changes overtime.

8. The method of claim 1, further comprising prohibiting access to a network if the threshold score is below a threshold level.

9. A system for controlling access to resources by monitoring a strength of a password, the system comprising a memory and a processor configured to:

receive a first request from a user to access a first resource;

receive, after receiving the first request, a user password from the user as a condition of determining whether access to the first resource should be granted;

successfully authenticate the received user password, wherein the user password has been authenticated at least one additional time in the past;

determine a password score for the user password after successfully authenticating the user password, wherein the password score indicates quality of the user password;

based on the determined password score, evaluate strength of the user password in a privacy preserving manner, wherein the privacy preserving manner indicates avoiding storing information regarding the user password in the memory or the processor after strength of the user password has been evaluated;

deny access to the first resource because the strength of the user password does not exceed a first threshold score;

receive a second request from the user to access a second resource;

receive the user password from the user as a condition of determining whether access to the second resource should be granted;

successfully authenticate the user password in connection with the second request;

determine a second password score for the user password after successfully authenticating the user password, wherein the second password score indicates quality of the user password;

based on the second password score, evaluate strength of the user password; and grant access to the second resource because the second password score exceeds a second threshold score.

10. The system of claim 9, wherein the second password score is different than the first password score.

11. The system of claim 9, wherein a client module resides within a web application, on a mobile device, or a computing device.

12. The system of claim 9, wherein determining the password score and evaluation of strength of the user password is performed by a password scorer module.

13. The system of claim 9, wherein a client module and a password scorer module reside within a single device.

14. The system of claim 13, wherein the user password is sent to a password scorer module over a secure connection.

15. The system of claim 9, wherein strength of the user password changes over time.

16. The system of claim 9, further comprising prohibiting access to a network if the score is below a threshold level.

17. A computer program product comprising a non-transitory processor-readable storage medium having stored therein program code of one or more software programs, wherein the program code when executed by at least one processing device causes the at least one processing device to:

receive a first request from a user to access a first resource;

receive, after receiving the first request, a user password from the user as a condition of determining whether access to the first resource should be granted;

successfully authenticate the received user password wherein the user password has been authenticated at least one additional time in the past;

determine a password score for the user password after successfully authenticating the user password, wherein the password score indicates quality of the user password;

based on the determined password score, evaluate strength of the user password in a privacy preserving manner, wherein the privacy preserving manner indicates avoiding storing information in the non-transitory, processor readable storage medium or a memory coupled thereto regarding the user password after strength of the user password has been evaluated;

deny access to the first resource because the strength of the user password does not exceed a first threshold score;

receive a second request from the user to access a second resource;

receive the user password from the user as a condition of determining whether access to the second resource should be granted;

successfully authenticate the user password in connection with the second request;
determine a second password score for the user password after successfully authenticating the user password, wherein the second password score indicates quality of the user password;
based on the second password score, evaluate strength of the user password; and
grant access to the second resource because the second password score exceeds a second threshold score.

* * * * *